(12) United States Patent
Magaki et al.

(10) Patent No.: US 8,924,064 B2
(45) Date of Patent: Dec. 30, 2014

(54) SHOVEL AND METHOD OF CONTROLLING SHOVEL

(71) Applicant: Sumitomo(S.H.I.) Construction Machinery Co., Ltd., Tokyo (JP)

(72) Inventors: Hideto Magaki, Chiba (JP); Ryuji Shiratani, Chiba (JP)

(73) Assignee: Sumitomo(S.H.I.) Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 14/066,752

(22) Filed: Oct. 30, 2013

(65) Prior Publication Data

US 2014/0058607 A1 Feb. 27, 2014

Related U.S. Application Data

(63) Continuation of application No. PCT/JP2012/064604, filed on Jun. 6, 2012.

(30) Foreign Application Priority Data

Jun. 9, 2011 (JP) ................................ 2011-129504

(51) Int. Cl.
| | | |
|---|---|---|
| B60W 20/00 | (2006.01) | |
| E02F 3/43 | (2006.01) | |
| E02F 9/20 | (2006.01) | |
| E02F 9/22 | (2006.01) | |
| F02D 41/02 | (2006.01) | |
| F02D 11/10 | (2006.01) | |
| F02D 31/00 | (2006.01) | |
| F02D 29/04 | (2006.01) | |
| F02D 41/00 | (2006.01) | |

(52) U.S. Cl.
CPC .............. *B60W 20/10* (2013.01); *E02F 9/2075* (2013.01); *E02F 9/2246* (2013.01); *F02D 41/021* (2013.01); *F02D 11/107* (2013.01); *F02D 31/002* (2013.01); *E02F 3/435* (2013.01); *F02D 41/0205* (2013.01); *F02D 29/04* (2013.01); *F02D 41/0007* (2013.01)
USPC ........................................................... 701/22

(58) Field of Classification Search
None
See application file for complete search history.

(56) References Cited

U.S. PATENT DOCUMENTS

| | | | | |
|---|---|---|---|---|
| 4,894,991 | A * | 1/1990 | Kawamura ...................... | 60/608 |
| 6,365,982 | B1 * | 4/2002 | Iles et al. ...................... | 290/40 B |
| 6,371,081 | B1 * | 4/2002 | Hawkins et al. ............... | 701/110 |
| 6,408,625 | B1 * | 6/2002 | Woon et al. ...................... | 60/608 |
| 6,820,356 | B2 * | 11/2004 | Naruse et al. ................... | 60/431 |

(Continued)

FOREIGN PATENT DOCUMENTS

| | | |
|---|---|---|
| JP | 10-042587 | 2/1998 |
| JP | 2001295674 A * | 10/2001 |

(Continued)

OTHER PUBLICATIONS

International Search Report mailed on Aug. 28, 2012.

*Primary Examiner* — John R Olszewski
*Assistant Examiner* — David Merlino
(74) *Attorney, Agent, or Firm* — IPUSA, PLLC

(57) ABSTRACT

A shovel includes an internal combustion engine, a hydraulic pump connected to the internal-combustion engine, a generator connected to the internal-combustion engine, and a control part that controls the generator. The control part increases an electric generation load of the generator before a hydraulic load of the hydraulic pump increases.

19 Claims, 7 Drawing Sheets

(56) References Cited

U.S. PATENT DOCUMENTS

| | | |
|---|---|---|
| 2010/0106389 A1* | 4/2010 | Fore et al. ............... 701/102 |
| 2011/0029175 A1* | 2/2011 | Kang et al. ............... 701/22 |
| 2011/0167811 A1* | 7/2011 | Kawaguchi et al. ....... 60/395 |
| 2013/0340429 A1* | 12/2013 | Desai et al. ............... 60/608 |

FOREIGN PATENT DOCUMENTS

| | | |
|---|---|---|
| JP | 2008-128107 | 6/2008 |
| JP | 2008-255941 | 10/2008 |
| JP | 2011-032857 | 2/2011 |

* cited by examiner

US 8,924,064 B2

SHOVEL AND METHOD OF CONTROLLING SHOVEL

CROSS-REFERENCE TO RELATED APPLICATION

This application is a continuation application of International Application PCT/JP2012/064604 filed on Jun. 6, 2012 claiming the priority of Japanese Patent Application No. 2011-129504 filed on Jun. 9, 2011 and being designated the U.S., the entire contents of which are incorporated herein by reference.

BACKGROUND OF THE INVENTION

1. Field of the Invention

The present invention relates to a shovel that performs operations by supplying hydraulic pressure generated by a hydraulic pump, which is driven by an engine, to a hydraulic operation element.

2. Description of the Related Art

In recent years, there are many case where an engine having a turbocharger (a turbo-type supercharger) is used as an engine (an internal-combustion engine) for a hydraulic shovel. The turbocharger is designed to increase engine output by introducing pressure obtained by rotating turbine with exhaust gas from the engine.

For example, if a boom as the hydraulic operation element is started to be driven while the shovel is operated, the hydraulic load suddenly increases. Then, a load on the engine, which has been maintaining a constant revolution speed, suddenly increases. The engine is controlled to maintain the constant revolution speed against the sudden increase of the load on the engine by increasing a fuel injection amount.

Therefore, there is proposed an output control device in, for example, Patent Document 1 in order to rapidly deal with the sudden increase of the load on the engine. The output control device controls so that the engine output rapidly increase by increasing a supercharge pressure in the engine having the turbocharger when an operation causing the load on the engine to suddenly increase is detected.

[Patent Document 1] Japanese Laid-open Patent Publication No. 2008-128107

SUMMARY OF THE INVENTION

In the output control disclosed in Patent Document 1, a supercharge pressure is increased after detecting the increase of the hydraulic load. Said differently, after the hydraulic load increases to a certain extent, the supercharge pressure is increased. At a time when the hydraulic load is increased to the certain extent, the load on the engine is increased, and the engine revolution speed is decreased. In order to increase the engine output from the above state and to increase the revolution speed, it is necessary to greatly increase the fuel injection amount not only for increasing the engine output but also for increasing the revolution speed.

Therefore, there is desired a development of a technique for increasing the engine output while substantially constantly maintaining the engine revolution speed even where the hydraulic load suddenly increases.

According to an aspect of the present invention, there is provided a shovel including an internal combustion engine, a hydraulic pump connected to the internal-combustion engine, a generator connected to the internal-combustion engine, and a control part that controls the generator, wherein the control part increases an electric generation load of the generator before a hydraulic load of the hydraulic pump increases.

According to another aspect of the present invention, there is provided a method of controlling a shovel including determining a change in a hydraulic load of a hydraulic pump, which is connected to an internal-combustion engine, and increasing an electric generation load of a generator, which is connected to the internal-combustion engine, before the hydraulic load of the hydraulic pump increases.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 7 of embodiments of the present invention. Where the same reference symbols are attached to the same parts, repeated description of the parts is omitted.

Figure 1:
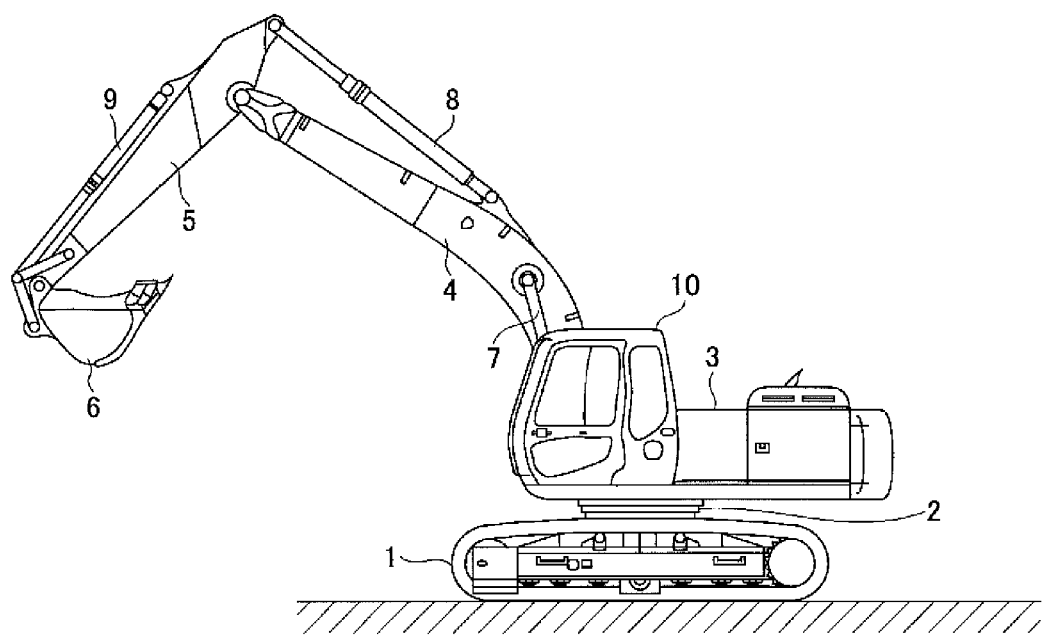
FIG. 1 is a side view of a hybrid-type shovel.

FIG. 1 is a side view of a hybrid-type shovel as an exemplary shovel to which the present invention is applicable. The shovel, to which the present invention is applied, is not limited to the hybrid-type shovel, and may be a shovel having another structure as long as the shovel has a driven element, for example, a generator, which can apply a load on an engine by being driven by the engine.

An upper-part swiveling body 3 is installed in a lower-part traveling body 1 of the hybrid-type shovel via a swivel mechanism 2. A boom 4 is attached to the upper-part swiveling body 3. An arm 5 is attached to an end of the boom 4, and a bucket 6 is attached to the end of the arm 5. The boom 4, the arm 5, and the bucket 6 are hydraulically driven by a boom cylinder 7, an arm cylinder 8, and a bucket cylinder 9, respectively. The upper-part swiveling body 3 has a cabin 10 and a power source such as an engine.

Figure 2:
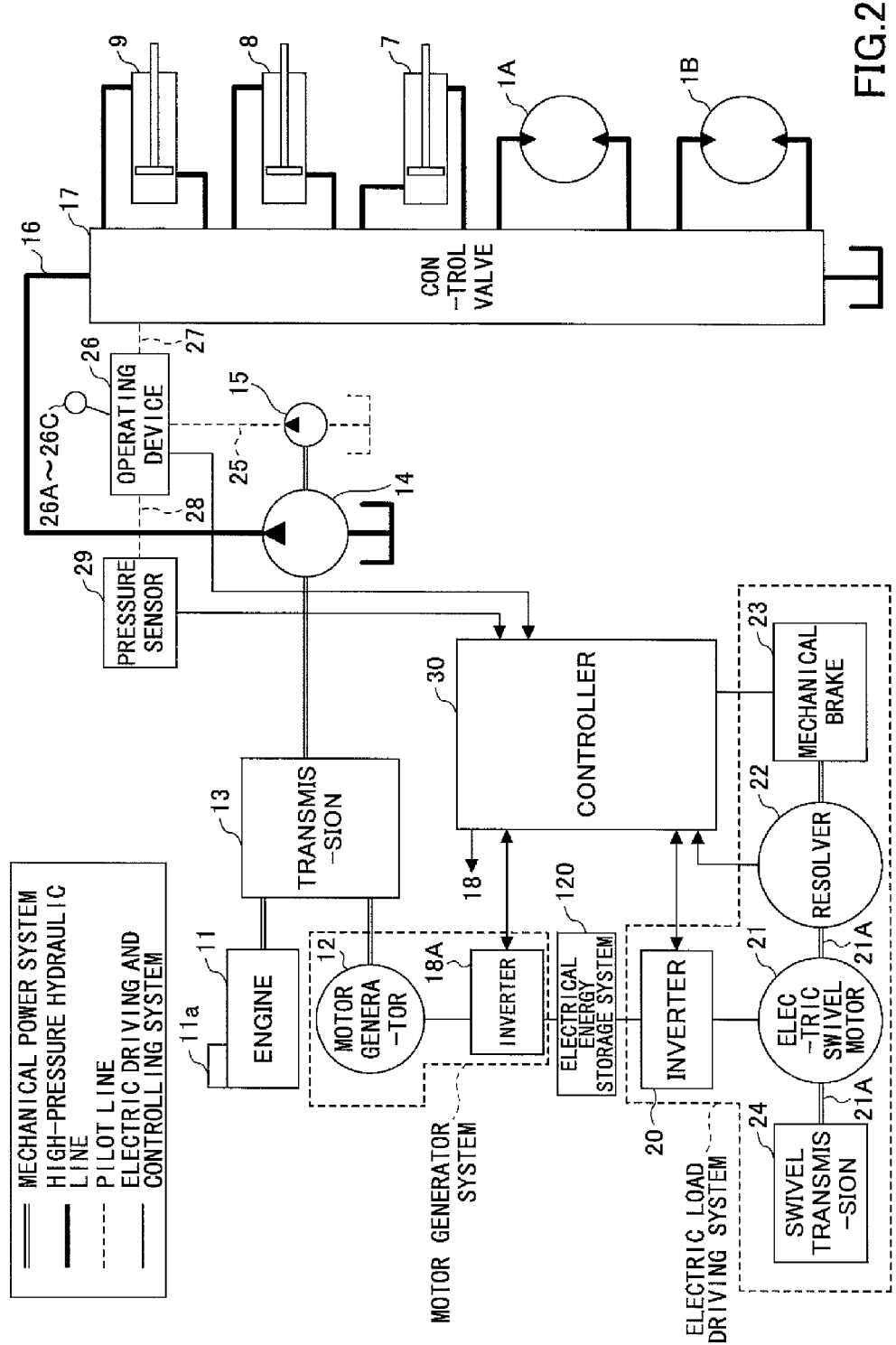
FIG. 2 is a block diagram illustrating a structure of a drive system of the hybrid-type shovel of an embodiment of the present invention.

FIG. 2 is a block diagram illustrating a driving system of the hybrid-type shovel illustrated in FIG. 1. Referring to FIG. 2, a mechanical power system is indicated by a double line, a high-pressure hydraulic line is indicated by a bold line, a pilot line is indicated by a broken line, and an electric driving and controlling system is indicated by a solid line.

An engine 11 as a mechanical drive part and a motor generator 12 as an assist drive part are both connected to two input shafts of a transmission 13. A main pump 14 as a hydraulic pump and a pilot pump 15 are connected to an output shaft of the transmission 13. A control valve 17 is connected to the main pump 14 through a high-pressure hydraulic line 16. The main pump 14 is a variable capacity hydraulic pump, in which an angle (a tilting angle) of a swash plate is controlled to adjust the stroke of a piston thereby controlling the discharge flow rate.

Within the embodiment, a supercharger 11a is provided in the engine 11. The supercharger 11a causes the output of the engine 11 to increase by increasing the intake pressure (by generating a supercharge pressure) using an exhaust gas exhausted from the engine 11.

The control valve 17 is a control device that controls a hydraulic system of the hybrid-type shovel. Hydraulic motors 1A (for the right) and 1B (for the left) for the lower-part traveling body 1, the boom cylinder 7, the arm cylinder 8, and the bucket cylinder 9 are connected to the control valve 17 through the high-pressure hydraulic line 16.

An electrical energy storage system 120 is connected to the motor generator 12 through an inverter 18A. An operating device 26 is connected to the pilot pump 15 through a pilot line 25. The operating device 26 includes a lever 26A, a lever 26B and a pedal 26C. The lever 26A, the lever 26B and the pedal 26C are connected to the control valve 17 and a pressure sensor 29 through hydraulic lines 27 and 28. The pressure sensor 29 is connected to a controller 30, which performs drive control of an electric system. Further, in a case where the operating device 26 is an electric type, an electric signal output from the operating device 26 may be used as a detection value in an operation state detecting portion.

In the hybrid-type shovel illustrated in FIG. 2, the swivel mechanism is electromotive. A electric swivel motor 21 is provided to drive the swivel mechanism 2. The electric swivel motor 21 as an electromotive operation element is connected to the electrical energy storage system 120 through the inverter 20. A resolver 22, a mechanical brake 23, and a swivel transmission 24 are connected to a rotation shaft 21A of the swivel motor 21. An electric load driving system is formed by the electric swivel motor 21, the inverter 20, the resolver 22, the mechanical brake 23, and the swivel transmission 24.

The controller 30 is a control device as a main control portion of performing drive control of the hybrid-type shovel. The controller 30 includes an arithmetic processing unit including a central processing unit (CPU) and an internal memory. When the CPU executes a program for drive control stored in the internal memory, the controller 30 is substantialized.

The controller 30 converts a signal supplied from the pressure sensor 29 to a speed command to thereby perform the drive control of the electric swivel motor 21. The signal supplied from the pressure sensor 29 corresponds to a signal indicative of an operation quantity of operating the operating device 26 for swiveling the swivel mechanism 2.

The controller 30 switches over a drive control of the motor generator 12 between an electromotive (assisting) drive and an electric generation drive, and simultaneously performs charge or discharge control in a capacitor 19 by performing drive control of the buck-boost converter 10 as a buck-boost controlling portion. The controller 30 performs switch control between boosting operation and bucking operation based on a charge state of the capacitor 19. Thus, charge or discharge control of the capacitor 19 is performed. Further, the controller 30 calculates a state of charge SOC of an electrical energy storage device (capacitor) based on a voltage value of the electrical energy storage device detected by a voltage detecting portion for the electrical energy storage device.

Further, the controller ordinarily determines whether electric generation is necessary based on requirement from an electric load. In a case where the electric generation is determined to be necessary, electric generation control for the motor generator is performed in response to the amount required by the electric load. The requirement of the electric load is, for example, requirement to charge the capacitor 19 and requirement to perform power run by the electric swivel motor 21.

Figure 3:
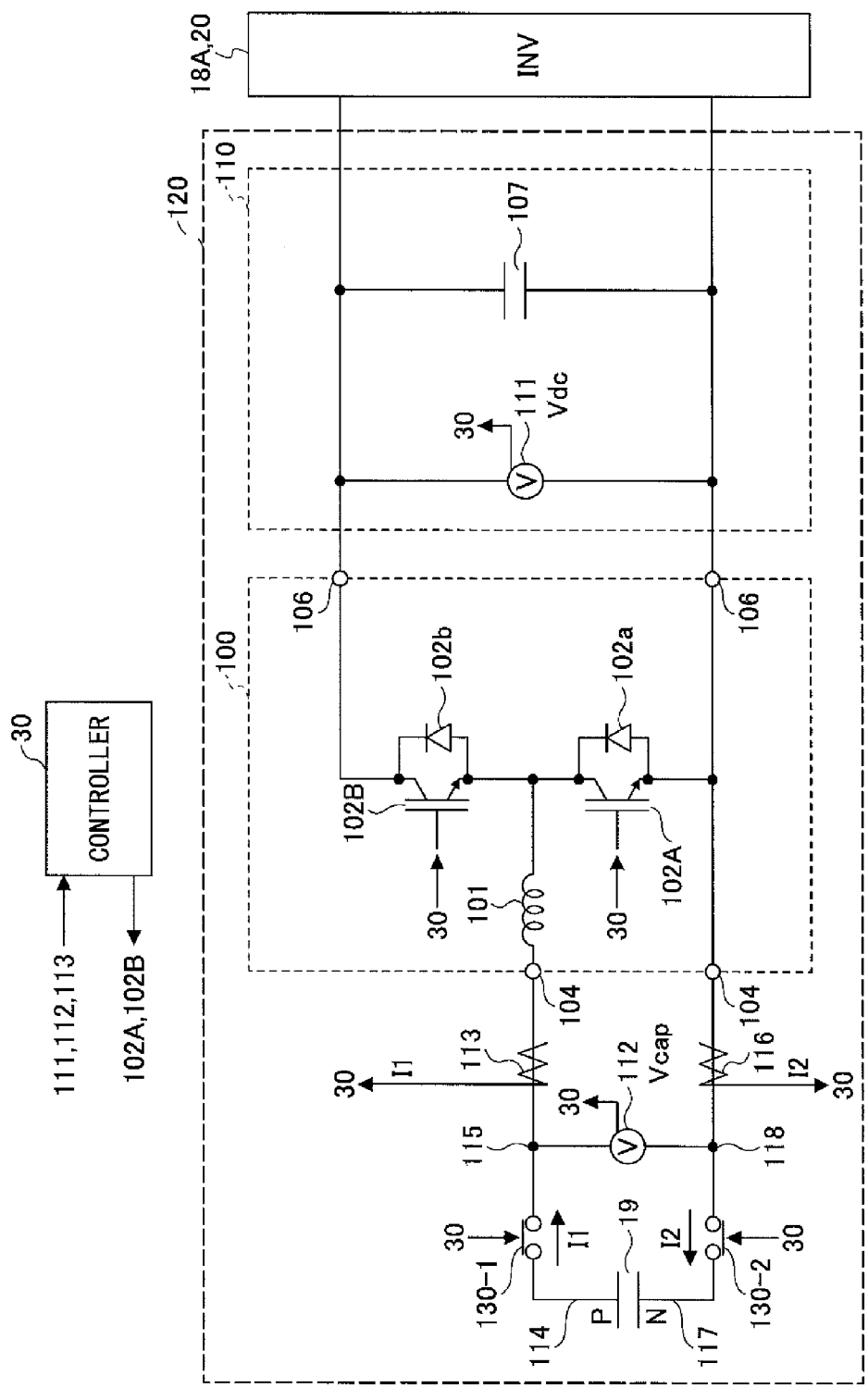
FIG. 3 is a circuit diagram of an electrical energy storage system.

FIG. 3 is a circuit diagram of an electrical energy storage system 120. The electrical energy storage system 120 includes the capacitor 19 as an electrical energy storage device, the buck-boost converter 100, and a DC bus 110. The DC bus 110 controls exchanges of electric power among the capacitor 19, the motor generator 12 and the electric swivel motor 21. The capacitor 19 includes a capacitor voltage detecting portion 112 for detecting a capacitor voltage value and a capacitor current detecting portion 113 for detecting a capacitor current value. The capacitor voltage value and the capacitor current value detected by the capacitor voltage detecting portion 112 and the capacitor current detecting portion 113 are supplied to the controller 30.

The buck-boost converter 100 switches over between the boosting operation and the bucking operation so as to converge a DC bus voltage value within a predetermined range depending on running states of the motor generator 12 and the electric swivel motor 21. The DC bus 110 is provided among the inverter 18A, the inverter 20, and the buck-boost converter 100 to exchange electric power among the capacitor 19, the motor generator 12 and the electric swivel motor 21.

A switch-over control between the boosting operation and the bucking operation in the buck-boost converter 100 is performed based on the DC bus voltage value detected by the DC bus voltage detecting portion 111, the capacitor voltage value detected by the capacitor voltage detecting portion 112, and the capacitor current value detected by the capacitor current detecting portion 113.

In the above described structure, the electric power generated by the motor generator 12 being the assist motor is supplied to the DC bus 110 of the power accumulation system 120 through the inverter 18A and supplied to the capacitor 19 through the buck-boost converter 100. Regenerative electric power generated by the electric swivel motor 21 is supplied to the DC bus 110 of the electrical energy storage system 120 through the inverter 20 and supplied to the capacitor 19 via the buck-boost converter 100.

The buck-boost converter 100 includes a reactor 101, an insulated gate bipolar transistor (IGBT) 102A for the boosting operation, an insulated gate bipolar transistor (IGBT) 102B for the bucking operation, electric power connection terminals 104 for connecting the capacitor 19, output terminals 106 for connecting the inverters 18A and 20, and a smoothing capacitor 107 inserted in parallel to the pair of the output terminals 106. The DC bus 110 connects the output terminals 106 of the buck-boost converter 100 to the inverters 18A and 20.

An end of the reactor 101 is connected to an intermediate point between the IGBT 102A for the boosting operation and the IGBT 102B for the bucking operation, and the other end of the reactor 101 is connected to the electric power connection terminal 104. The reactor 101 is provided to supply induced electromotive force caused when the IGBT 102A for the boosting operation is turned on and off.

The IGBT 102A for the boosting operation and the IGBT 102B for the bucking operation include a bipolar transistor having a gate in which a metal oxide semiconductor field effect transistor is integrated. The IGBT 102A for the boosting operation and the IGBT 102B for the bucking operation are semiconductor elements (switching elements) which can perform high-power and high-speed switching. The IGBT 102A for the boosting operation and the IGBT 102B for the bucking operation are driven when a PWM voltage is applied to the gate terminals of the IGBTs 102A and 102B by the controller 30. Diodes 102a and 102b, which are rectifying elements, are connected to the IGBT 102A for the boosting operation and the IGBT 102B for the bucking operation in parallel, respectively.

Figure 4:
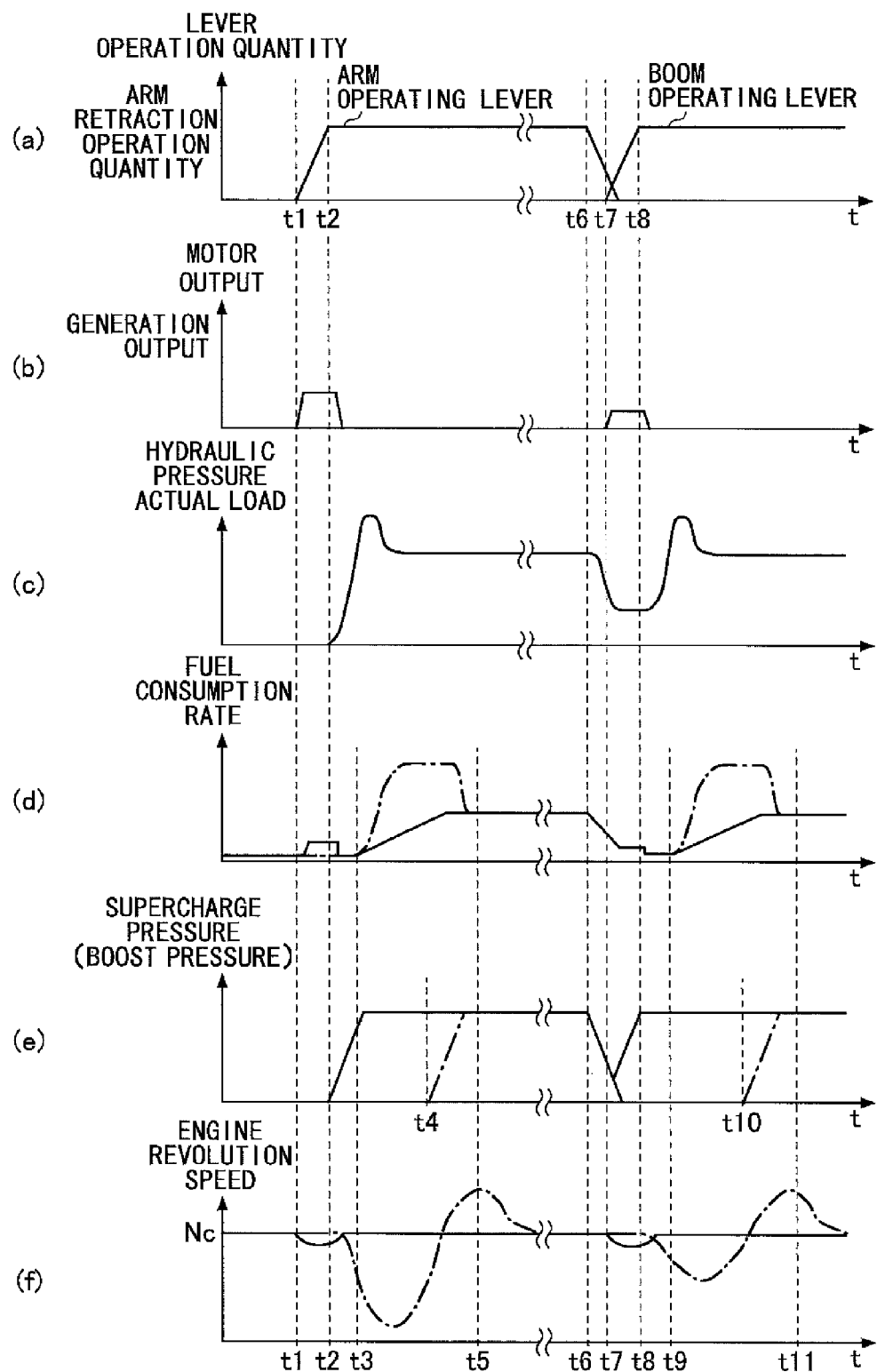
FIG. 4 is a time chart illustrating changes of various control elements in a case where an engine control of a first embodiment of the present invention is performed.

The capacitor 19 may be an electrical energy storage device, which can be charged and discharged so that electric power is exchanged between the capacitor 19 and the DC bus 110 via the buck-boost converter 100. FIG. 4 illustrates the capacitor 19 as the electrical energy storage device. However, a chargeable and dischargeable secondary battery such as a lithium ion battery, a lithium ion capacitor, or another mode of a power source capable of exchanging the electric power may be used instead of the capacitor 19.

The electric power connection terminals 104 and the outputs terminals 106 may be of any type as long as the capacitor 19 and the inverters 18A and 20 are connectable, respectively. The capacitor voltage detecting portion 112 for detecting the capacitor voltage is connected between the pair of the electric power connection terminals 104. The DC bus voltage detecting portion 111 for detecting the DC bus is connected between the pair of output terminals 106.

The capacitor voltage detecting portion 112 detects a voltage value Vcap of the capacitor 19. The DC bus voltage detecting portion 111 detects a voltage value Vdc of the DC bus 110. The smoothing capacitor 107 is inserted between a positive electrode and a negative electrode of the output terminals 106 to smooth the DC bus voltage. The voltage of the DC bus 110 is maintained to be a predetermined voltage by the smoothing capacitor 107.

The capacitor current detecting unit 113 a detecting means for detecting a value of a current flowing into the capacitor 19 on a side of the positive terminal (a P terminal) of the capacitor 19 and includes a resistor for detecting the current. The capacitor current detecting unit 113 detects a current value I1 flowing through the positive terminal of the capacitor 19. Meanwhile, the capacitor current detecting portion 116 is a detecting means for detecting the value of the current flowing into the capacitor 19 on a side of the negative terminal (an N terminal) of the capacitor 19 and includes a resistor for detecting the current. The capacitor current detecting portion 116 detects a current value I2 flowing through the negative terminal of the capacitor 19.

When a boosting operation is performed in the buck-boost converter 100 to boost the voltage of the DC bus 110, a PWM voltage is applied to the gate terminal of the IGBT 102A for the boosting operation. Induced electromotive force, which is generated in the reactor 101 while turning on and off the IGBT 102A for the boosting operation, is supplied to the DC bus 110 through the diode 102b connected parallel to the IGBT 102B for the bucking operation. Thus, the voltage of the DC bus 110 is boosted up.

When the voltage of the DC bus 110 is bucked, the PWM voltage is applied to the gate terminal of the IGBT 102B for the bucking operation, regenerative electric power supplied from the inverter 18A or 20 through the IGBT 102B for the bucking operation is supplied to the capacitor 19 through the DC bus 110. Then, the electric power stored in the DC bus 110 is charged into the capacitor 19, and the voltage of the DC bus 110 is bucked. Here, in a case where the electric power is stored (charged) into the capacitor 19, the capacitor 19 functions as an electric load for the motor generator 12.

Within the first embodiment, a relay 130-1 is provided as a shutoff switch for shutting off a power supply line 114, which connects the positive terminal of the capacitor 19 to the electric power connection terminal 104 of the buck-boost converter 100. The relay 130-1 is arranged between the positive terminal of the capacitor 19 and a connection point 115 of the capacitor voltage detecting portion 112, which is connected to the power supply line 114. The relay 130-1 is operated by a signal from the controller 30. By shutting off the power supply line 114 extending from the capacitor 19, the capacitor 19 can be disconnected from the buck-boost converter 100.

Further, a relay 130-2 is provided as a shutoff switch for shutting off a power supply line 117, which connects the negative terminal of the capacitor 19 to the electric power connection terminal 104 of the buck-boost converter 100. The relay 130-2 is arranged between the negative terminal of the capacitor 19 and a connection point 118 of the capacitor voltage detecting portion 112, which is connected to the power supply line 117. The relay 130-2 is operated by a signal from the controller 30. By shutting off the power supply line 117 extending from the capacitor 19, the capacitor 19 can be disconnected from the buck-boost converter 100. The relay 130-1 and the relay 130-2 may be integrated as a single relay to enable simultaneously disconnecting both of the power supply line 114 on the positive terminal side and the power supply line 117 on the negative terminal side from the capacitor 19.

Practically, there is a driving portion for generating the PWM signal for driving the IGBT 102A for the boosting operation and the IGBT 102B for the bucking operation between the controller 30 and each one of the IGBT 102A for the boosting operation and the IGBT 102B for the bucking operation. However, the driving portion is omitted from the illustration in FIG. 3. The driving portion may be substantialized by any one of an electronic circuit or an arithmetic processing unit.

Within the first embodiment, in the hybrid-type shovel described above, the load is previously applied to the engine in order to increase the engine output before the load on the engine 11 starts to increase due to the increase of the hydraulic load. Thus, even if the load on the engine 11 starts to increase due to the increase of the hydraulic load, it is possible to rapidly increase the engine output while maintaining the revolution speed of the engine 11 and to decrease the fuel consumption rate of the engine 11. Within the first embodiment, the motor generator 12 driven by the engine 11 is used as a means for previously applying the load on the engine 11.

FIG. 4 is a time chart illustrating changes of various control elements in a case where an engine control of the first embodiment of the present invention is performed. Referring to FIG. 4, a solid line represents changes of the control elements in a case where the engine control of the first embodiment is performed, and a dot chain line represents changes of the control elements in a case where the engine control of the first embodiment is not performed. The changes (the dot chain line) of the control elements in the case where the engine control of the first embodiment is not performed are illustrated to compare with the changes of the control elements in the case where the engine control of the first embodiment is performed.

Referring to FIG. 4, (a) illustrates a change of an operation quantity of an operating lever (the arm operating lever), (b) illustrates a change of an output (electrically generated power) from the motor generator 12, (c) illustrates a change of a hydraulic pressure actual load (a load generated by driving the arm) applied to the engine 11, (d) illustrates a change of the fuel consumption rate of the engine 11, (e) illustrates a change of the supercharge pressure (a boost pressure) generated by the supercharger, and (f) illustrates a change of the engine revolution speed.

An example illustrated in FIG. 4 is a case where the arm operating lever is operated at a time t1 in an excavating operation using the shovel and thereafter the boom operating lever is operated at a time t7 in a boom lifting operation.

For comparison, the changes of the control elements in the case where the engine control of the first embodiment is not performed are described first.

At the time t1, the arm operating lever starts to be operated for performing the excavating operation. The operation quantity (an angle tilting the operating lever) of the arm operating lever is increased from the time t1 to the time t2. At the time t2, the operation quantity of the arm operating lever is maintained constant. Said differently, the arm operating lever is operated and tilted from the time t1, and the angle of the arm operating lever is maintained constant at the time t2. When the arm operating lever starts to be operated at the time t1, the arm 5 starts to move. At the time t2, the arm operating lever is completely tilted to make the arm 5 completely tilted.

From the time t2 when the arm operating lever is completely tilted, a discharge pressure of the main pump 14 increases due to the load applied to the arm 5, and the hydraulic load of the main pump 14 starts to increase. As illustrated in (c) of FIG. 4, the hydraulic load of the main pump 14 starts to increase at around the time t2. The hydraulic load of the main pump 14 corresponds to the load on the engine 11, and the load on the engine 11 increases along with the increase of the hydraulic load of the main pump 14. As a result, as indicated by a dot chain line in (f) of FIG. 4, the revolution speed of the engine 11 conspicuously decreases around after the time t2. Meanwhile, when there is no hydraulic load, the revolution speed of the engine 11 is controlled to maintain a predetermined revolution speed Nc.

When the load on the engine 11 increases and it is detected that the engine revolution speed shifts from the predetermined revolution speed Nc, the engine 11 is controlled to increase the fuel injection amount of the engine 11. Accordingly, as illustrated in the dot chain line in (d) of FIG. 4, the fuel consumption rate of the engine 11 increases after the time t3. Said differently, a command of increasing the fuel injection amount of the engine 11 is issued at the time t3. The amount of the fuel supplied to the engine 11 is increased thereby increasing the fuel consumption rate.

When the fuel injection amount is increased at the time t3, the decreasing engine revolution speed increases as indicated by the dot chain line in (f) of FIG. 4. Further, when the load on the engine 11 increases, the supercharge pressure (the boost pressure) starts to be increased at the time t4 as indicated by the dot chain line in (e) of FIG. 4. Therefore, the combustion efficiency of the engine 11 is enhanced thereby efficiently increasing the output of the engine 11.

When the engine revolution speed reaches the predetermined revolution speed Nc after the engine revolution speed continues to increase, the engine revolution speed is controlled to maintain the predetermined revolution speed Nc. However, the engine revolution speed is not immediately stabilized at the predetermined revolution speed Nc, and continues to increase after exceeding the predetermined revolution speed Nc. At the time t5, the engine revolution speed starts to decrease, and simultaneously the fuel consumption rate starts to decrease. As described, even after the engine revolution speed reaches the predetermined revolution speed Nc, an overshoot occurs without immediately stabilizing at the predetermined revolution speed Nc. Further, a timing of the change in the fuel consumption rate delays from a timing of the injection command. Therefore, even if the engine revolution speed reaches the predetermined revolution speed Nc, the fuel consumption rate is not immediately decreased.

When the fuel consumption rate starts to decrease at the time t5, the engine revolution speed stops increasing. Thereafter, the engine revolution speed decreases and is stably maintained at the predetermined revolution speed Nc.

At the time t6, the operator starts to return the arm operating lever to a neutral position in order to finish the excavating operation. Then, the hydraulic load caused by the arm 5 decreases, and the hydraulic load of the main pump 14 also decreases. Along with the decrease of the hydraulic load, the load on the engine 11 also decreases. Therefore, the fuel consumption rate and the supercharge pressure become substantially zero.

Subsequently, after the fuel consumption rate and the supercharge pressure start to decrease, the operator operates the boom operating lever in order to perform the boom lifting operation at the time t7. As illustrated in (a) of FIG. 4, the operation quantity of the boom operating lever starts to increase from the time t7, and the operation quantity is maintained constant at the time t8.

The hydraulic pressure actual load decreased after finishing the operation of the arm starts to increase again for operating the boom 4 after the time t7. Said differently, after the boom operating lever starts to be operated at the time t7, the boom 4 starts to move, and the boom operating lever is completely tilted at the time t8.

From the time t8 when the boom operating lever is completely tilted, the discharge pressure of the main pump 14 increases due to the load applied to the boom 4, and the hydraulic load of the main pump 14 starts to increase. As illustrated in (c) of FIG. 4, the hydraulic load of the main pump 14 starts to increase around after the time t8. The hydraulic load of the main pump 14 corresponds to the load on the engine 11, and the load on the engine 11 increases along with the increase of the hydraulic load of the main pump 14. As a result, as indicated by the dot chain line in (f) of FIG. 4, the revolution speed of the engine 11 conspicuously decreases around after the time t8.

When the load on the engine 11 increases and it is detected that the engine revolution speed shifts from the predetermined revolution speed Nc, the engine 11 is controlled to increase the fuel injection amount of the engine 11. Accordingly, as illustrated in the dot chain line in (d) of FIG. 4, the fuel consumption rate of the engine 11 increases after the time t9. Said differently, a command of increasing the fuel injection amount of the engine 11 is issued at the time t9. The amount of the fuel supplied to the engine 11 is increased thereby increasing the fuel consumption rate.

When the fuel injection amount is increased at the time t9, the decreasing engine revolution speed increases as indicated by the dot chain line in (f) of FIG. 4. Further, when the load on the engine 11 increases, the supercharge pressure (the boost pressure) starts to be increased at the time t4 as indicated by the dot chain line in (e) of FIG. 4. Therefore, the combustion efficiency of the engine 11 is enhanced thereby efficiently increasing the output of the engine 11.

When the engine revolution speed reaches the predetermined revolution speed Nc after the engine revolution speed continues to increase, the engine revolution speed is controlled to maintain the predetermined revolution speed Nc. However, the engine revolution speed is not immediately stabilized at the predetermined revolution speed Nc, and continues to increase after exceeding the predetermined revolution speed Nc. At the time t11, the engine revolution speed starts to decrease, and simultaneously the fuel consumption rate starts to decrease. As described, even after the engine revolution speed reaches the predetermined revolution speed Nc, an overshoot occurs without immediately stabilizing at the predetermined revolution speed Nc. Further, a timing of the change in the fuel consumption rate delays from a timing of the injection command. Therefore, even if the engine revolution speed reaches the predetermined revolution speed Nc, the fuel consumption rate is not immediately decreased.

When the fuel consumption rate starts to decrease at the time t11, the engine revolution speed stops increasing. Thereafter, the engine revolution speed decreases and is stably maintained at the predetermined revolution speed Nc.

As described, with an ordinary engine control for a shovel, the engine revolution speed conspicuously decreases along with the increase of the hydraulic pressure actual load. In order to recover the conspicuously decreased engine revolution speed, the fuel consumption rate is conspicuously increased (as indicated by the dot chain line between the time t3 and the time t5 and between the time t9 and the time t11).

Therefore, in the engine control of the first embodiment, the amount of fuel used to recover the engine revolution speed is decreased as small as possible by restricting the drop of the engine revolution speed.

Next, referring to FIG. 4, the change of the control elements in the case where the engine control of the first embodiment of the present invention is performed is described. Referring to FIG. 4, the changes of the control elements in the case where the engine control of the first embodiment of the present invention is performed are indicated by the solid lines.

At the time t1, the arm operating lever starts to be operated for performing the excavating operation. The operation quantity (an angle of tilting the operating lever) of the arm operating lever is increased from the time t1 to the time t2. At the time t2, the operation quantity of the arm operating lever is maintained constant. Said differently, the arm operating lever is operated and tilted from the time t1, and the angle of the arm operating lever is maintained constant at the time t2. When the arm operating lever starts to be operated at the time t1, the arm 5 starts to move. At the time t2, the arm operating lever is completely tilted to make the arm 5 completely tilted.

In the engine control of the first embodiment, when it is detected that the arm operating lever is operated at the time t1, the controller 30 immediately causes the motor generator 12 to perform an electric generation drive. A time duration while the motor generator 12 performs the electric generation drive is a short time of, for example, about 0.1 seconds. Because the motor generator 12 is driven by the output of the engine 11 to perform the electric generation drive, a load is applied to the engine 11 due to the electric generation drive. As a result, as indicated by the solid line in (f) of FIG. 4, the engine revolution speed stars to decrease.

When the engine revolution speed starts to decrease, the engine revolution speed is controlled to maintain the predetermined revolution speed Nc. Then, the fuel injection amount is increased and therefore the fuel consumption rate is increased. Because the time duration while the motor generator 12 performs the electric generation drive is a short time and an electrically generated output is set small, although the engine revolution speed starts to decrease at the time t1 as indicated by the solid line in (f) of FIG. 4, the fuel injection amount is immediately increased thereafter. Therefore, the engine revolution speed immediately increases and returns to the predetermined revolution speed Nc again.

As described, because the load is previously applied to the engine at the time t1, the supercharge pressure immediately starts to increase at the time t2 when the arm operating lever is completely tilted as indicated by the solid line in (e) of FIG. 4. Thereafter, the electric generation drive of the motor generator 12 is finished, and the engine revolution speed returns to the predetermined revolution speed Nc. Then, the increased fuel consumption rate is decreased.

As described, by applying the load on the engine 11 using the electric generation drive for the short time in response to the operation of the operating lever, it is possible to start to increase the supercharge pressure at the time t2 when the hydraulic pressure actual load starts increasing. Said differently, after detecting or determining a start of an increase of the hydraulic load of the main pump 14 based on the operation quantity of the operating lever and after detecting that the hydraulic pressure increases, the motor generator 12 is caused to perform the electric generation drive. Accordingly, it is possible to apply the load on the engine 11 by increasing an electric generation load of the motor generator 12. The reason why the load is applied on the engine 11 is to previously increase the supercharge pressure of the engine 11 so that the engine 11 can deal with the increase of the hydraulic pressure actual load (i.e., the hydraulic load of the main pump 14).

After the time t2, the hydraulic pressure actual load increases and the load on the engine 11 also increases. At the time t3, a command of increasing the fuel injection amount is issued. As illustrated in (d) of FIG. 4, the fuel consumption rate gradually increases. The increased amount of the fuel consumption rate corresponds to the increase of the hydraulic pressure actual load. Said differently, since the engine revolution speed is already maintained at the predetermined revolution speed Nc, the fuel consumption rate is not excessively required for increasing the engine revolution speed. Further, at the time t3, the supercharge pressure is increased to be the predetermined value. Therefore, even if the hydraulic pressure actual load increases, it is possible to efficiently increase the output of the engine 11. Therefore, it is possible to prevent the fuel consumption rate from increasing. This effect is indicated by a difference between the dot chain line (the case where the engine control of the first embodiment is not performed) and the solid line (the case where the engine control of the first embodiment is performed) between the times t3 and t5 in (d) of FIG. 4.

At the time t6, the operator starts to return the arm operating lever to the neutral position in order to finish the excavating operation. Then, the hydraulic load caused by the arm 5 decreases, and the hydraulic load of the main pump 14 also decreases. Along with the decrease of the hydraulic load, the load on the engine 11 also decreases. Therefore, the fuel consumption rate and the supercharge pressure start decreasing.

Subsequently, after the fuel consumption rate and the supercharge pressure start to decrease, the operator operates the boom operating lever in order to perform the boom lifting operation at the time t7. As illustrated in (a) of FIG. 4, the operation quantity of the boom operating lever starts to increase from the time t7, and the operation quantity is maintained constant at the time t8.

In the engine control of the first embodiment, when it is detected that the boom operating lever is operated at the time t7, the controller 30 immediately causes the motor generator 12 to perform the electric generation drive. A time duration while the motor generator 12 performs the electric generation drive is a short time of, for example, about 0.1 seconds. Since the motor generator 12 is driven by the output of the engine 11 to perform the electric generation drive, a load is applied to the engine 11 due to the electric generation drive. As a result, as indicated by the solid line in (f) of FIG. 4, the engine revolution speed stars to decrease.

When the engine revolution speed starts to decrease, the engine revolution speed is controlled to maintain the predetermined revolution speed Nc. Then, the fuel injection amount is increased and therefore the fuel consumption rate is increased. Because the time duration while the motor generator 12 performs the electric generation drive is a short time and an electrically generated output is set small, although the engine revolution speed starts to decrease at the time t7 as indicated by the solid line in (f) of FIG. 4, the fuel injection amount is immediately increased thereafter. Therefore, the engine revolution speed immediately increases and returns to the predetermined revolution speed Nc again.

As described, since the load is previously applied to the engine 11 at the time t7, as indicated by the solid line in (e) of FIG. 4, the supercharge pressure starts to increase after the time t7 and increases up to a predetermined value. Thereafter, the electric generation drive of the motor generator 12 is finished, and the engine revolution speed returns to the predetermined revolution speed Nc. Then, the increased fuel consumption rate is decreased.

As described above, by applying the load on the engine 11 using the electric generation drive for the short time in response to the operation of the operating lever, it is possible to start to increase the supercharge pressure before the hydraulic pressure actual load starts increasing.

After the time t8, the hydraulic pressure actual load increases and the load on the engine 11 also increases. At the time t9, a command of increasing the fuel injection amount is issued. As illustrated in (d) of FIG. 4, the fuel consumption rate gradually increases. The increased amount of the fuel consumption rate corresponds to the increase of the hydraulic pressure actual load. Said differently, since the engine revolution speed is already maintained at the predetermined revolution speed Nc, the fuel consumption rate is not excessively required for increasing the engine revolution speed. Further, at the time t9, the supercharge pressure is increased to be the predetermined value. Therefore, even if the hydraulic pressure actual load increases, it is possible to efficiently increase the output of the engine 11. Therefore, it is possible to prevent the fuel consumption rate from increasing. This effect is indicated by a difference between the dot chain line (the case where the engine control of the first embodiment is not performed) and the solid line (the case where the engine control of the first embodiment is performed) between the times t9 and t11 in (d) of FIG. 4.

As described, within the first embodiment, the start of the increase of the hydraulic pressure actual load (the hydraulic load of the main pump 14) is detected or determined based on the operation of the operating lever, and the electric generation load of the motor generator 12 is increased before the hydraulic pressure actual load increases. Accordingly, before the load on the engine 11 actually increases or when the load increases, the revolution speed of the engine 11 becomes the predetermined revolution speed Nc, and additionally the supercharge pressure of the engine 11 can also be increased. Said differently, it is possible to prevent the supercharge pressure of the engine 11 from decreasing to be lower than the predetermined value. Therefore, the engine revolution speed does not conspicuously decrease, and it is unnecessary to consume the fuel for increasing the engine revolution speed. The electric generation load of the motor generator 12 is ordinarily increased when the state of charge of the capacitor 19 decreases. Within the first embodiment, regardless of whether the electric load requires the electric generation by the motor generator 12, the electric generation load of the motor generator 12 is increased to control the drive of the engine 11. If the electric load is not required to be generated by the motor generator 12, the electric generation load of the motor generator 12 is increased to control the drive of the engine 11.

Next, an engine control of a second embodiment of the present invention is described.

Figure 5:
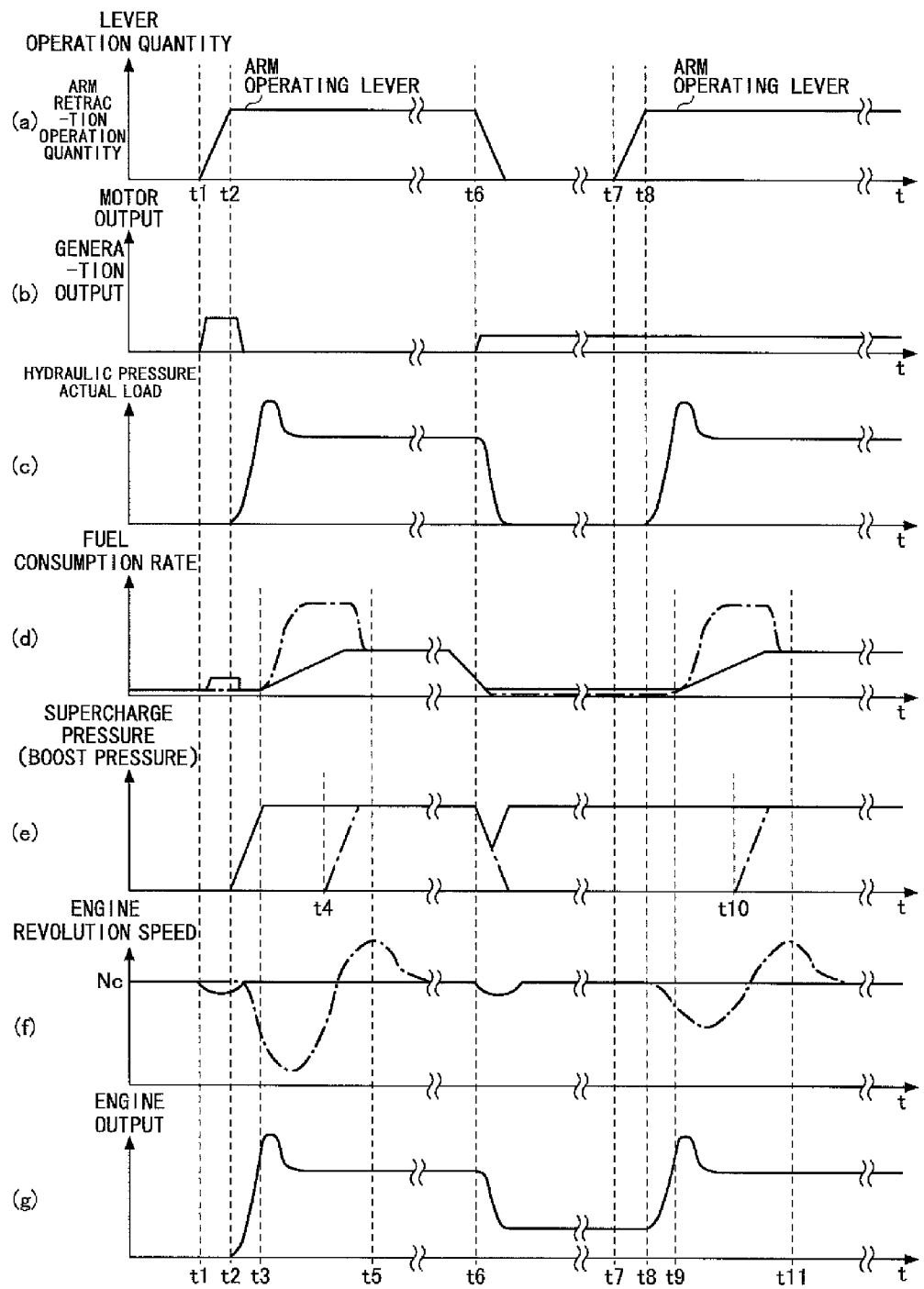
FIG. 5 is a time chart illustrating changes of various control elements in a case where an engine control of a second embodiment of the present invention is performed.

FIG. 5 is a time chart illustrating changes of various control elements in a case where the engine control of the second embodiment of the present invention is performed. Referring to FIG. 5, a solid line represents changes of the control elements in a case where the engine control of this embodiment is performed, and a dot chain line represents changes of the control elements in a case where the engine control of this embodiment is not performed. The changes (the dot chain line) of the control elements in the case where the engine control of this embodiment is not performed are illustrated to compare with the changes of the control elements in the case where the engine control of this embodiment is performed.

Referring to FIG. 5, (a) illustrates a change of an operation quantity of the operating lever (the arm operating lever), (b) illustrates a change of an output (electrically generated power) from the motor generator 12, (c) illustrates a change of the hydraulic pressure actual load (a load generated by driving the arm) applied to the engine 11, (d) illustrates a change of the fuel consumption rate of the engine 11, (e) illustrates a change of the supercharge pressure (the boost pressure) generated by the supercharger, (f) illustrates a change of the engine revolution speed, and (g) illustrates a change of the engine output.

An example illustrated in FIG. 5 is a case where the arm operating lever is operated at a time t1 in the excavating operation using the shovel and thereafter the arm operating lever is operated at a time t7 again.

For comparison, the changes of the control elements in the case where the engine control of this embodiment is performed are described first. Operations between the time t1 and the time t6 are the same as the operations between the time t1 and the time t6 in FIG. 4.

At the time t1, the arm operating lever starts to be operated for performing the excavating operation. The operation quantity (the angle of tilting the operating lever) of the arm operating lever is increased from the time t1 to the time t2. At the time t2, the operation quantity of the arm operating lever is maintained constant. Said differently, the arm operating lever is operated and tilted from the time t1, and the angle of the arm operating lever is maintained constant at the time t2. When the arm operating lever starts to be operated at the time t1, the arm 5 starts to move. At the time t2, the arm operating lever is completely tilted to make the arm 5 completely tilted.

From the time t2 when the arm operating lever is completely tilted, the discharge pressure of the main pump 14 increases due to the load applied to the arm 5, and the hydraulic load of the main pump 14 starts to increase. As illustrated in (c) of FIG. 5, the hydraulic load of the main pump 14 starts to increase at around the time t2. The hydraulic load of the main pump 14 corresponds to the load on the engine 11, and the load on the engine 11 increases along with the increase of the hydraulic load of the main pump 14. As a result, as indicated by a dot chain line in (f) of FIG. 5, the revolution speed of the engine 11 suddenly decreases around after the time t2. Meanwhile, when there is no hydraulic load, the revolution speed of the engine 11 is controlled to maintain the predetermined revolution speed Nc.

When the load on the engine 11 increases and it is detected that the engine revolution speed shifts from the predetermined revolution speed Nc, the engine 11 is controlled to increase the fuel injection amount of the engine 11. Accordingly, as illustrated in the dot chain line of (d) of FIG. 5, the fuel consumption rate of the engine 11 increases from the time t3. Said differently, at the time t3, a command of increasing the fuel injection amount of the engine 11 is issued at the time t3. The amount of the fuel supplied to the engine 11 is increased thereby increasing the fuel consumption rate.

When the fuel injection amount is increased, the decreasing engine revolution speed increases as indicated by the dot chain line in (f) of FIG. 5. Further, when the load on the engine 11 increases, the supercharge pressure (the boost pressure) starts to be increased at the time t4 as indicated by the dot chain line of (e) of FIG. 5. Therefore, the combustion efficiency of the engine 11 is enhanced thereby efficiently increasing the output of the engine 11.

When the engine revolution speed reaches the predetermined revolution speed Nc after the engine revolution speed continues to increase, the engine revolution speed is controlled to maintain the predetermined revolution speed Nc. However, the engine revolution speed is not immediately stabilized at the predetermined revolution speed Nc, and continues to increase after exceeding the predetermined revolution speed Nc. At the time t5, the engine revolution speed starts to decrease, and simultaneously the fuel consumption rate starts to decrease. As described, even after the engine revolution speed reaches the predetermined revolution speed Nc, an overshoot occurs without immediately stabilizing at the predetermined revolution speed Nc. Further, the timing of the change in the fuel consumption rate delays from the timing of the injection command. Therefore, even if the engine revolution speed reaches the predetermined revolution speed Nc, the fuel consumption rate is not immediately decreased.

When the fuel consumption rate starts to decrease at the time t5, the engine revolution speed stops to increase. Thereafter, the engine revolution speed decreases and is stably maintained at the predetermined revolution speed Nc.

At the time t6, the operator starts to return the arm operating lever to the neutral position in order to finish the excavating operation. Then, the hydraulic load caused by the arm 5 decreases, and the hydraulic load of the main pump 14 also decreases. Along with the decrease of the hydraulic load, the load on the engine 11 decreases, and the fuel consumption rate and the supercharge pressure start to decrease. When the lever operation quantity becomes zero, the fuel consumption rate and the supercharge pressure return to their original values.

In the example illustrated in FIG. 5, the excavating operation is stopped for, for example, 2 seconds after the arm operating lever is returned and is restarted at the time t7. Therefore, the operation of the arm operating lever is restarted at the time t7, the operation quantity (the angle of tilting the operating lever) of the arm operating lever is increased between the time t7 and t8. At the time t8, the operation quantity of the arm operating lever is maintained constant. Said differently, the arm operating lever is operated and tilted from the time t7, and the angle of the arm operating lever is maintained constant at the time t8. When the arm operating lever starts to be operated at the time t7, the arm 5 starts to move. At the time t8, the arm operating lever is completely tilted.

From the time t2 when the arm operating lever is completely tilted, the discharge pressure of the main pump 14 increases due to the load applied to the arm 5, and the hydraulic load of the main pump 14 starts to increase. As illustrated in (c) of FIG. 5, the hydraulic load of the main pump 14 starts to increase at around the time t8. The hydraulic load of the main pump 14 corresponds to the load on the engine 11, and the load on the engine 11 increases along with the increase of the hydraulic load of the main pump 14. As a result, as indicated by the dot chain line in (f) of FIG. 5, the revolution speed of the engine 11 suddenly decreases around after the time t8. On the other hand, when there is no hydraulic load, the revolution speed of the engine 11 is controlled to maintain the predetermined revolution speed Nc.

When the load on the engine 11 increases and it is detected that the engine revolution speed shifts from the predetermined revolution speed Nc, the engine 11 is controlled to increase the fuel injection amount of the engine 11. Accordingly, as illustrated in the dot chain line of (d) of FIG. 5, the fuel consumption rate of the engine 11 increases after the time t9. Said differently, a command of increasing the fuel injection amount of the engine 11 is issued at the time t9. The amount of the fuel supplied to the engine 11 is increased thereby increasing the fuel consumption rate.

When the fuel injection amount is increased at the time t9, the decreasing engine revolution speed increases as indicated by the dot chain line in (f) of FIG. 5. Further, when the load on the engine 11 increases, the supercharge pressure (the boost pressure) starts to be increased at the time t10 as indicated by the dot chain line of (e) of FIG. 5. Therefore, the combustion efficiency of the engine 11 is enhanced thereby efficiently increasing the output of the engine 11.

When the engine revolution speed reaches the predetermined revolution speed Nc after the engine revolution speed continues to increase, the engine revolution speed is controlled to maintain the predetermined revolution speed Nc. However, the engine revolution speed is not immediately stabilized at the predetermined revolution speed Nc, and continues to increase after exceeding the predetermined revolution speed Nc. At the time t11, the engine revolution speed starts to decrease, and simultaneously the fuel consumption rate starts to decrease. As described, even after the engine revolution speed reaches the predetermined revolution speed Nc, an overshoot occurs without immediately stabilizing at the predetermined revolution speed Nc. Further, the timing of the change in the fuel consumption rate delays from the timing of the injection command. Therefore, even if the engine revolution speed reaches the predetermined revolution speed Nc, the fuel consumption rate is not immediately decreased.

When the fuel consumption rate starts to decrease at the time t11, the engine revolution speed stops increasing. Thereafter, the engine revolution speed decreases and is stably maintained at the predetermined revolution speed Nc.

The case where the engine control of this embodiment is not performed is described above in order to compare with the case where the engine control of this embodiment is performed.

Next, referring to FIG. 5, the change of the control elements in the case where the engine control of this embodiment is performed is described. Referring to FIG. 5, the changes of the control elements in the case where the engine control of this embodiment of the present invention is performed are indicated by the solid lines.

At the time t1, the arm operating lever starts to be operated for performing the excavating operation. The operation quantity (the angle of tilting the operating lever) of the arm operating lever is increased from the time t1 to the time t2. At the time t2, the operation quantity of the arm operating lever is maintained constant. Said differently, the arm operating lever is operated and tilted from the time t1, and the angle of the arm operating lever is maintained constant at the time t2. When the arm operating lever starts to be operated at the time t1, the arm 5 starts to move. At the time t2, the arm operating lever is completely tilted to make the arm 5 completely tilted.

In the engine control of this embodiment, when it is detected that the arm operating lever is operated at the time t1, the controller 30 immediately causes the motor generator 12 to perform the electric generation drive. A time duration while the motor generator 12 performs the electric generation drive is a short time of, for example, about 0.1 seconds. Since the motor generator 12 is driven by the output of the engine 11 to perform the electric generation drive, a load is applied to the engine 11 due to the electric generation drive. As a result, as indicated by the solid line of (f) of FIG. 5, the engine revolution speed starts to decrease.

When the engine revolution speed starts to decrease, the engine revolution speed is controlled to maintain the predetermined revolution speed Nc. Then, the fuel injection amount is increased and therefore the fuel consumption rate is increased. Because the time duration while the motor generator 12 performs the electric generation drive is a short time and an electrically generated output is set small, although the engine revolution speed starts to decrease at the time t as indicated by the solid line in (f) of FIG. 5, the fuel injection amount is immediately increased thereafter. Therefore, the engine revolution speed immediately increases and returns to the predetermined revolution speed Nc again.

As described, since the load is previously applied to the engine at the time t1, the supercharge pressure immediately starts to increase at the time t2 when the arm operating lever is completely tilted as indicated by the solid line in (e) of FIG. 5. Thereafter, the electric generation drive of the motor generator 12 is finished, and the engine revolution speed returns to the predetermined revolution speed Nc. Then, the increased fuel consumption rate is decreased.

As described, by applying the load on the engine 11 using the electric generation drive for the short time in response to the operation of the operating lever, it is possible to start increasing the supercharge pressure at the time t2 when the hydraulic pressure actual load starts increasing.

After the time t2, the hydraulic pressure actual load increases and the load on the engine 11 also increases. At the time t3, a command of increasing the fuel injection amount is issued. As illustrated in (d) of FIG. 5, the fuel consumption rate gradually increases. The increased amount of the fuel consumption rate corresponds to the increase of the hydraulic pressure actual load. Said differently, since the engine revolution speed is already maintained at the predetermined revolution speed Nc, the fuel consumption rate is not excessively required for increasing the engine revolution speed. Further, at the time t3, the supercharge pressure is increased to be a predetermined value. Therefore, even if the hydraulic pressure actual load increases, it is possible to efficiently increase the output of the engine 11. Therefore, it is possible to prevent the fuel consumption rate from increasing. This effect is indicated by a difference between the dot chain line (the case where the engine control of this embodiment is not performed) and the solid line (the case where the engine control of this embodiment is performed) between the times t3 and t5 in (d) of FIG. 5.

At the time t6, the operator starts to return the arm operating lever to the neutral position in order to finish the excavating operation. Then, the hydraulic load caused by the arm 5 decreases, and the hydraulic load of the main pump 14 also decreases. Along with the decrease of the hydraulic load, the load on the engine 11 also decreases. Therefore, the fuel consumption rate and the supercharge pressure start decreasing.

In the engine control of this embodiment, when it is detected that the arm operating lever is operated at the time t6, the controller 30 immediately causes the motor generator 12 to perform the electric generation drive. A time duration while the motor generator 12 performs the electric generation drive is a short time of, for example, about 3 seconds. Since the motor generator 12 is driven by the output of the engine 11 to perform the electric generation drive, a load is applied to the engine 11 due to the electric generation drive. As a result, as indicated by the solid line in (f) of FIG. 5, the engine revolution speed stars to decrease.

However, when the load caused by the electric generation drive is applied to the engine 11, the supercharge pressure is once decreased on or after the time t6 and is increased again to the original value as indicated by the solid line in (e) of FIG. 5. Further, along with the decrease of the engine revolution speed, a control works to maintain the engine revolution speed to be the predetermined revolution speed Nc. Therefore, the fuel injection amount is not returned to an original value and is constantly maintained to be a certain level of fuel injection amount. Therefore, although the fuel consumption rate starts to decrease from the time t6, the fuel consumption rate becomes a certain constant fuel consumption rate without returning to an original level as indicated by the solid line in (d) of FIG. 5.

Next, at the time t7, the operator operates the arm operating lever again to continue the excavating operation. The operation quantity (the angle of tilting the operating lever) of the arm operating lever is increased from the time t7 to the time t8. At the time t8, the operation quantity of the arm operating lever is maintained constant. Said differently, the arm operating lever is operated and tilted from the time t7, and the angle of the arm operating lever is maintained constant at the time t8. When the arm operating lever starts to be operated at the time t7, the arm 5 starts to move. At the time t8, the arm operating lever is completely tilted to make the arm 5 completely tilted.

After the time t8, the hydraulic pressure actual load increases and the load on the engine 11 also increases. At the time t9, a command of increasing the fuel injection amount is issued. As indicated by the line in (d) of FIG. 5, the fuel consumption rate gradually increases. The increased amount of the fuel consumption rate corresponds to the increase of the hydraulic pressure actual load. Said differently, since the engine revolution speed is already maintained at the predetermined revolution speed Nc, the fuel consumption rate is not excessively required for increasing the engine revolution speed. Further, at the time t9, the supercharge pressure is maintained to be the predetermined value. Therefore, even if the hydraulic pressure actual load increases, it is possible to efficiently increase the output of the engine 11. Therefore, it is possible to prevent the fuel consumption rate from increasing. This effect is indicated by a difference between the dot chain line (the case where the engine control of this embodiment is not performed) and the solid line (the case where the engine control of this embodiment is performed) between the times t9 and t11 in (d) of FIG. 5.

As described in this embodiment, even in a case where the lever operation is once finished and the hydraulic load becomes zero, when it is detected that the lever operation becomes zero, the electric generation drive is performed in the motor generator 12 for a predetermined time in order to apply a load to the engine 11. With this, the decrease of the supercharge pressure is restricted and the supercharge pressure is returned to have the predetermined value. When the lever operation is restarted within the predetermined time, the engine output is increased while the engine revolution speed is maintained to be the predetermined revolution speed Nc.

In the above examples of the controls, it is detected or determined that the hydraulic load of the main pump 14 decreases to be zero based on the operation quantity of the main pump 14. However, this detection or determination may be based on the change of the hydraulic pressure actual load, the change of the supercharge pressure, the change of the engine output, or a combination of these changes. For example, when the arm operating lever is returned to the neutral position at the time t6, the hydraulic pressure actual load (i.e., the hydraulic load of the main pump 14) starts to immediately decrease as illustrated in (c) of FIG. 5. It is possible to previously determine that the hydraulic load is to be zero when the hydraulic pressure actual load starts decreasing. Instead, when the arm operating lever is returned to the neutral position at the time t6, the supercharge pressure of the engine 11 starts to immediately decrease as illustrated in (e) of FIG. 5. Therefore, it is possible to previously determine that the hydraulic load is to be zero based on the start of the decrease of the supercharge pressure. Instead, when the arm operating lever is returned to the neutral position at the time t6, the engine output starts to immediately decrease in conformity with the hydraulic pressure actual load as illustrated in (g) of FIG. 5. Therefore, it is possible to previously determine that the hydraulic load is to be zero based on the start of the decrease of the engine output.

Within this embodiment, the time duration while the electric generation drive is performed in the motor generator 12 from the time t6 is previously set to be around 3 seconds. However, the electric generation drive is continuously performed in the motor generator 12 until the arm operating lever is operated again at the time t7. Although the time duration while the electric generation drive is performed may be set to be an arbitrary time period, because the electric power generated by the electric generation drive is charged in the capacitor 19 of the electrical energy storage system 120, it is necessary to set the state of charge (SOC) of the capacitor so as not to exceed the upper limit value. Said differently, a time duration while the electric generation drive in the motor generator 12 is performed from the time t7 needs to be until the state of charge (SOC) of the capacitor 19 becomes the upper limit value.

As described, the electric generation load of the motor generator 12 is ordinarily increased when the state of charge of the capacitor 19 decreases. Within this embodiment, regardless of whether the electric load requires the electric generation by the motor generator 12, the electric generation load of the motor generator 12 is increased to control the drive of the engine 11. If the electric load is not required to be generated by the motor generator 12, the electric generation load of the motor generator 12 is increased to control the drive of the engine 11. Said differently, it is possible to prevent the supercharge pressure of the engine 11 from decreasing to be lower than the predetermined value.

Figure 6:
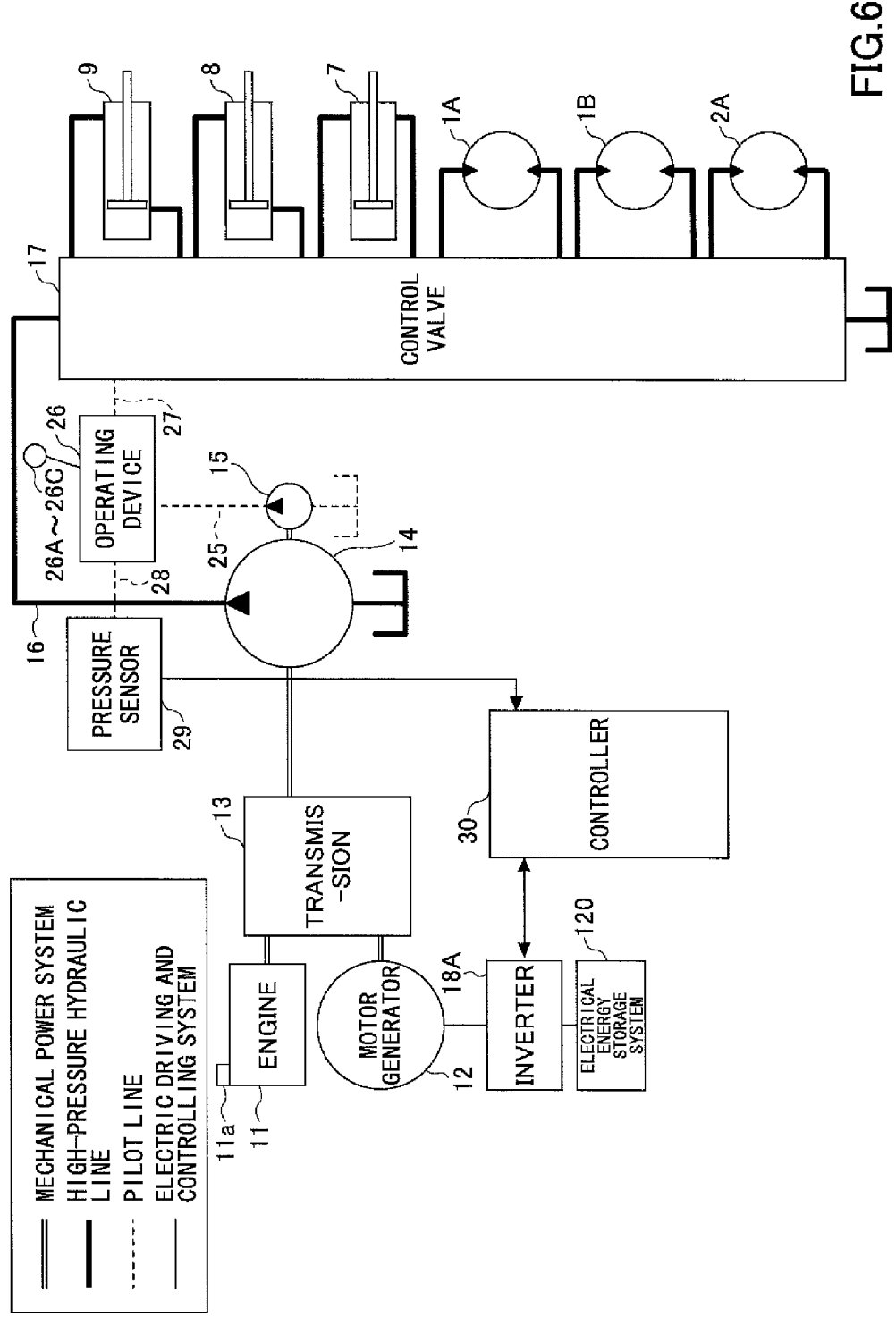
FIG. 6 is a block diagram illustrating a structure of a driving system of the hybrid-type shovel in which a swivel mechanism is driven by a hydraulic swivel motor.
Figure 7:
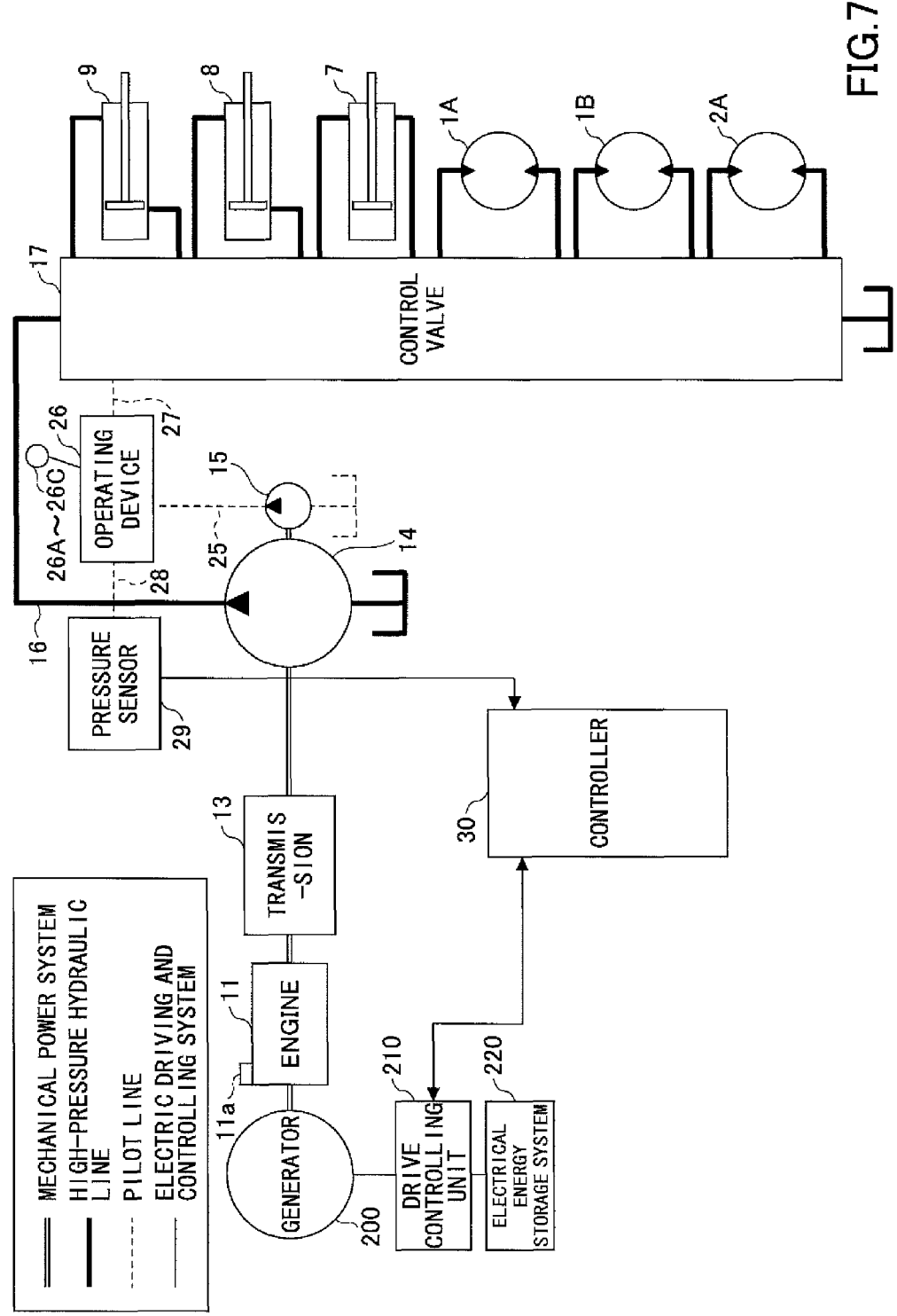
FIG. 7 is a block diagram illustrating a structure of another driving system of the hydraulic shovel.

In the above description, the swivel mechanism 2 is electromotive. However, there is a case where the swivel mechanism 2 is not to be electrically driven and is hydraulically driven. FIG. 6 is a block chart illustrating a driving system of the hybrid-type shovel, in which the swivel mechanism illustrated in FIG. 2 is changed to a hydraulic drive type. Referring to the hybrid-type hydraulic shovel illustrated in FIG. 6, a hydraulic swivel motor 2A is connected to the control valve 17 instead of the electric swivel motor 21, and the swivel mechanism 2 is driven by the hydraulic swivel motor 2A. In this hybrid-type shovel, a drop of the engine revolution speed is restricted and the increase of the fuel consumption rate can be prevented by applying the load to the engine 11 by performing the electric generation drive in the motor generator 12.

In the above embodiments, a so-called hybrid-type shovel, in which the engine 11 and the motor generator 12 are connected to the main pump 14 being the hydraulic pump to thereby drive the main pump 14, is applied to the present invention. However, the present invention can be applied not only to the hybrid-type shovel but also to a shovel in which the main pump 14 is driven by the engine 11. In this case, because the motor generator 12 does not exist, a generator 200 is provide to apply a load to the engine 11. The electric power obtained by an electric generation drive in the generator 200 is supplied to an electrical energy storage system 220 as the electric load through a drive controlling unit 210 for the generator such as a voltage regulator or an inverter, and is stored in the electrical energy storage system 220. The electrical energy storage system 220 may be provided to drive an electric component such as an air conditioner.

In the above structure, the generator 200 functions as the motor generator 12 in the above embodiments. Said differently, when an operation of the operating lever is detected, an electric generation drive is performed in the generator 200 to apply a load to the engine 11. Thus, a decrease of the engine revolution speed is restricted and an increase of the fuel consumption rate is restricted.

According to the above invention, even if the hydraulic load suddenly increases, it is possible to increase the engine output while substantially constantly maintaining the revolutions speed of the engine, and to decrease the fuel consumption rate of the engine. Further, it is possible to improve responsiveness in an operate time.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the shovel has been described in detail, it should be understood that the various changes, substitutions, and alterations could be made hereto without departing from the spirit and scope of the invention.

What is claimed is:

1. A method of controlling a shovel comprising:
    determining a change in a hydraulic load of a hydraulic pump, which is connected to an internal-combustion engine; and
    increasing a load applied to the internal-combustion engine by generating electricity with a generator, which is connected to the internal-combustion engine, before the hydraulic load of the hydraulic pump increases
    wherein a supercharge pressure generated by a supercharger, which is provided in the internal-combustion engine, is increased or is maintained to have a value equal to or greater than a predetermined value by increasing an electric generation load of the generator so as to increase the load applied onto the internal-combustion engine.

2. The method of controlling the shovel according to claim 1,
    wherein the increasing the electric generation load of the generator, which is connected to the internal-combustion engine, occurs regardless of whether an electric load, to which electric power generated by the generator is supplied, requires electric generation.

3. The method of controlling the shovel according to claim 1,
wherein a load is applied to the internal-combustion engine by driving the generator when a hydraulic load, which is being applied to the hydraulic pump, is decreased.

4. The method of controlling the shovel according to claim 3,
wherein the load applied to the internal-combustion engine is decreased or is stopped being applied to the internal-combustion engine by operating the generator when a predetermined time passes after the decrease of the hydraulic load, which is being applied to the hydraulic pump, is detected and the hydraulic load exceeds a predetermined value.

5. The method of controlling the shovel according to claim 1,
wherein the supercharge pressure generated by the supercharger is increased by driving the generator so as to apply the load to the internal-combustion engine when an operating lever is operated to drive a hydraulic operation element.

6. A shovel comprising:
an internal combustion engine;
a hydraulic pump connected to the internal-combustion engine;
a generator connected to the internal-combustion engine;
a control part that controls the generator; and
an electric load to which electric power generated by the generator is supplied,
wherein the control part increases a load applied to the internal-combustion engine by generating electricity with the generator before a hydraulic load of the hydraulic pump increases,
wherein the control part increases the load applied to the internal-combustion engine by generating electricity with the generator regardless of whether the electric load requires electric generation.

7. The shovel according to claim 6,
wherein the control part applies a load to the internal-combustion engine by driving the generator when a hydraulic load, which is being applied to the hydraulic pump, is decreased during an operation of the shovel.

8. The shovel according to claim 7,
wherein the control part decreases the load applied to the internal-combustion engine or stops applying the load to the internal-combustion engine by operating the generator when a predetermined time passes after the decrease of the hydraulic load, which is being applied to the hydraulic pump, is detected and the hydraulic load exceeds a predetermined value.

9. The shovel according to claim 7,
wherein the control part detects a change of the hydraulic load applied to the hydraulic pump based on at least any one of an operation quantity of an operation lever for driving a hydraulic operation element, a discharge pressure of the hydraulic pump, a supercharge pressure of the internal-combustion engine, and an output of the internal-combustion engine.

10. The shovel according to claim 6,
wherein the control part causes the supercharge pressure generated by the supercharger to increase by driving the generator so as to apply the load to the internal-combustion engine when an operating lever is operated to drive a hydraulic operation element.

11. The shovel according to claim 10,
wherein the control part decreases the load applied to the internal-combustion engine or stops applying the load to the internal-combustion engine by operating the generator when a predetermined time passes after an operation quantity of the operation lever exceeds a predetermined value.

12. The shovel according to claim 6,
wherein the control part increases the load applied to the internal-combustion engine by the generator before the hydraulic load of the hydraulic pump increases to cause an output from the internal-combustion engine to be increased before the hydraulic load of the hydraulic pump increases.

13. A shovel comprising:
an internal combustion engine;
a hydraulic pump connected to the internal-combustion engine;
a generator connected to the internal-combustion engine; and
a control part that controls the generator,
wherein the control part increases a load applied to the internal-combustion engine by generating electricity with the generator before a hydraulic load of the hydraulic pump increases,
wherein the control part causes a supercharge pressure generated by a supercharger, which is provided in the internal-combustion engine, to increase or to be maintained to have a value equal to or greater than a predetermined value by increasing the load applied to the internal-combustion engine by generating electricity with the generator so as to increase the load applied to the internal-combustion engine.

14. The shovel according to claim 13,
wherein the control part applies a load to the internal-combustion engine by driving the generator when a hydraulic load, which is being applied to the hydraulic pump, is decreased during an operation of the shovel.

15. The shovel according to claim 14,
wherein the control part decreases the load applied to the internal-combustion engine or stops applying the load to the internal-combustion engine by operating the generator when a predetermined time passes after the decrease of the hydraulic load, which is being applied to the hydraulic pump, is detected and the hydraulic load exceeds a predetermined value.

16. The shovel according to claim 14,
wherein the control part detects a change of the hydraulic load applied to the hydraulic pump based on at least any one of an operation quantity of an operation lever for driving a hydraulic operation element, a discharge pressure of the hydraulic pump, a supercharge pressure of the internal-combustion engine, and an output of the internal-combustion engine.

17. The shovel according to claim 13,
wherein the control part causes the supercharge pressure generated by the supercharger to increase by driving the generator so as to apply the load to the internal-combustion engine when an operating lever is operated to drive a hydraulic operation element.

18. The shovel according to claim 17,
wherein the control part decreases the load applied to the internal-combustion engine or stops applying the load to the internal-combustion engine by operating the generator when a predetermined time passes after an operation quantity of the operation lever exceeds a predetermined value.

19. The shovel according to claim 13,
wherein the control part increases the load applied to the internal-combustion engine by the generator before the hydraulic load of the hydraulic pump increases to cause an output from the internal-combustion engine to be increased before the hydraulic load of the hydraulic pump increases.

* * * * *